United States Patent [19]

Howard

[11] Patent Number: 4,657,824
[45] Date of Patent: Apr. 14, 1987

[54] VERTICAL MAGNETIC RECORDING MEDIUM WITH AN INTERMETALLIC COMPOUND NUCLEATING LAYER

[75] Inventor: James K. Howard, Morgan Hill, Calif.

[73] Assignee: International Business Machines Corporation, Armonk, N.Y.

[21] Appl. No.: 791,963

[22] Filed: Oct. 28, 1985

[51] Int. Cl.$^4$ .............................................. G11B 5/66
[52] U.S. Cl. ................................... 428/611; 428/661; 428/667; 428/678; 428/928
[58] Field of Search ............... 428/928, 938, 678, 641, 428/634, 636, 660, 662, 661, 666, 667, 668, 637, 664, 611; 360/135, 131

[56] References Cited

FOREIGN PATENT DOCUMENTS

| 0093838 | 2/1983 | European Pat. Off. |
| 122232 | 9/1980 | Japan ................................... 360/131 |
| 59077620 | 10/1982 | Japan . |
| 29927 | 2/1985 | Japan ................................... 360/131 |

OTHER PUBLICATIONS

T. M. Coughlin, J. Vac. Sci. Technol., 20(2), Feb. 1982, "Nitrogen-Induced fcc Phase in rf Sputtered Co-Cr Films Having the hcp Phase and Perpendicular Anisotropy", pp. 171-174.
J. C. Lodder et al., Thin Solid Films, 101 (1983) 61-73, "R.F.-Sputtered CoCr Layers for Perpendicular Magnetic Recording".
"High Density Perpendicular Magnetic Recording on Rigid Disks", Fujitsu Sci. Tech. J., 19, 1, pp. 99-126, Mar. 1983.
"Recording on Perpendicular Anisotropy Media with Ring Heads", IEEE Transactions on Magnetics, vol. Mag-17, No. 6, Nov. 1981, pp. 2547-2549.
"Constitution of Binary Alloys", by Hansen, McGraw Hill, 1958, p. 519.

Primary Examiner—Melvyn J. Andrews
Assistant Examiner—John J. Zimmerman
Attorney, Agent, or Firm—Thomas R. Berthold

[57] ABSTRACT

A vertical magnetic recording media has a ternary alloy magnetic layer deposited on an intermetallic compound nucleating layer. In one example the intermetallic phase of cobalt and tungsten, which occurs at a discrete stoichiometric ratio of 3 to 1, i.e. Co$_3$W, forms a nucleating layer deposited on the media substrate. A magntic layer of (CoCr)$_{90}$W$_{10}$ is formed on the nucleating layer. Both the nucleating layer and the magnetic layer have a hexagonal crystalline structure with hexagonal cell constants which are related by an integral multiple. The film structure has minimal C-axis dispersion and an excellent ratio of perpendicular to horizontal coercivities.

11 Claims, 5 Drawing Figures

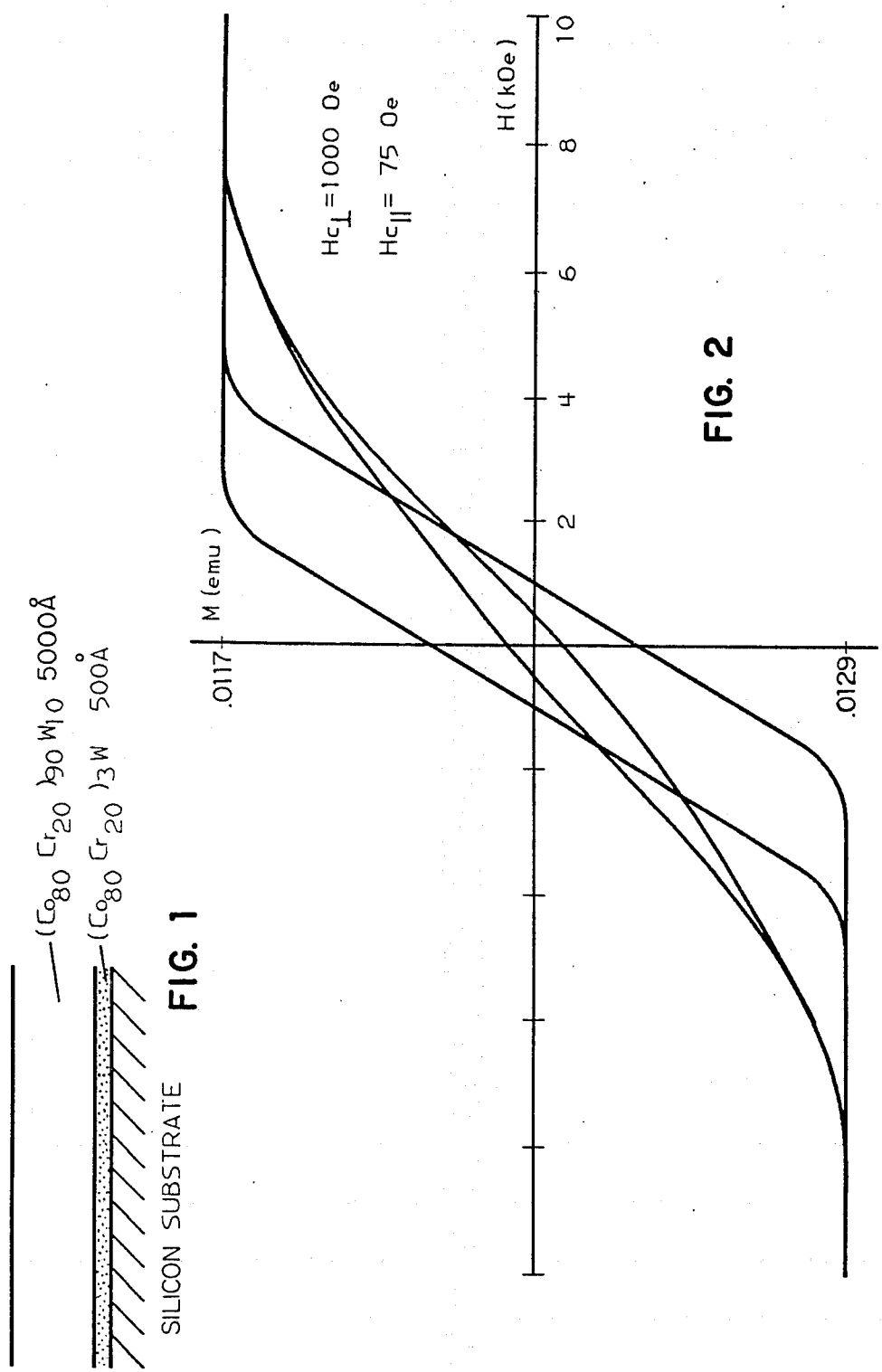

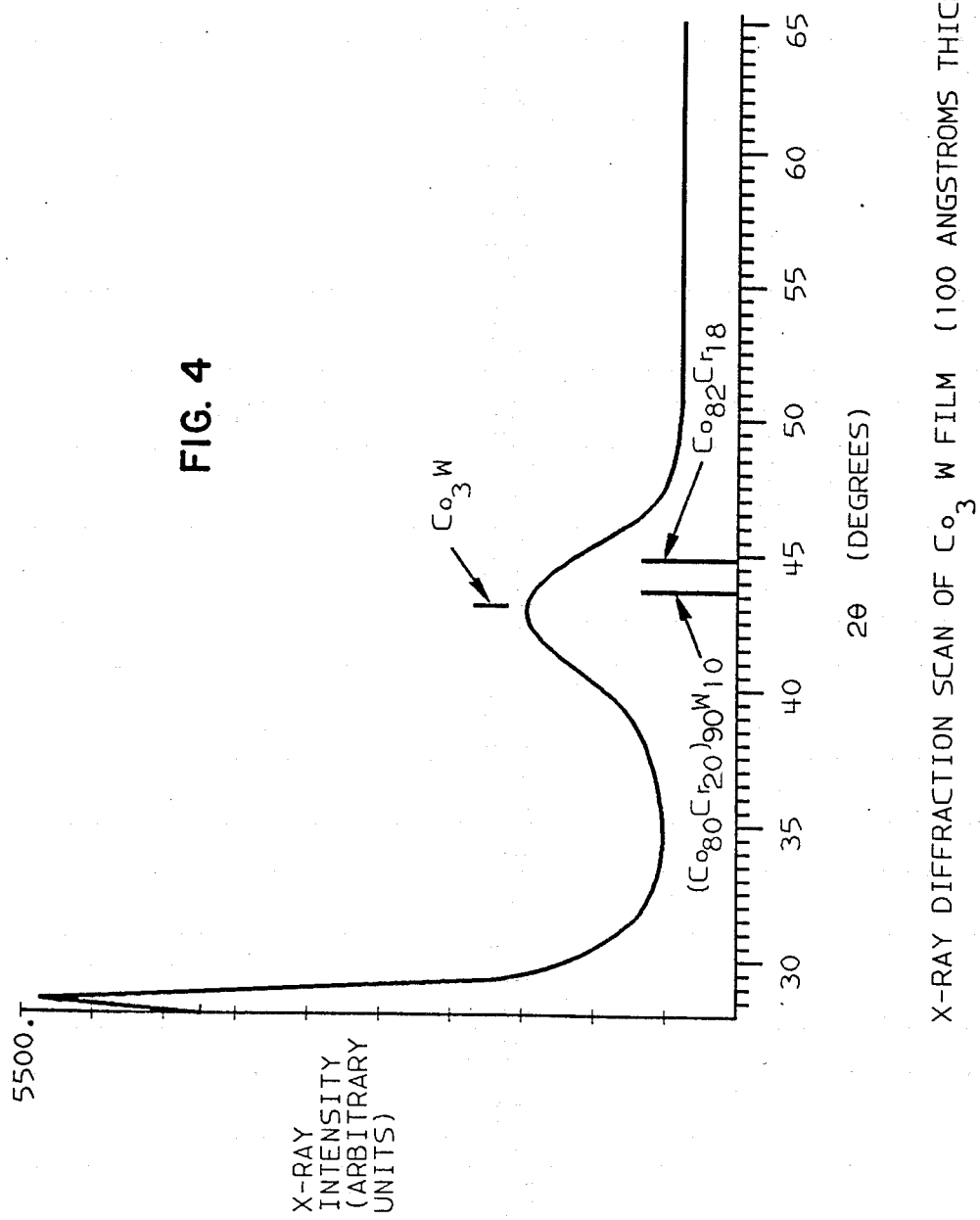

VERTICAL MAGNETIC RECORDING MEDIUM WITH AN INTERMETALLIC COMPOUND NUCLEATING LAYER

TECHNICAL FIELD

This invention relates to vertical magnetic recording media, and in particular to a thin film metal alloy recording disk with improved perpendicular magnetic anisotropy having an intermetallic compound nucleating layer between the disk substrate and the magnetic layer.

BACKGROUND OF THE INVENTION

Thin film metal alloy disks for vertical magnetic recording typically comprise a substrate, a nonmagnetic underlayer formed on the substrate and a magnetic layer having an ordered crystalline formation with a generally perpendicular magnetic anisotropy formed on the nonmagnetic underlayer. One type of material used as the magnetic layer is a cobalt-chromium (CoCr) alloy which is sputter-deposited to form a film having a hexagonal close packed (HCP) crystalline structure with the [00.2] axis (the C-axis) oriented perpendicular to the disk substrate. An important factor in the production of vertical magnetic recording media is the ability to control the orientation of the HCP CoCr or cobalt-chromium-X (CoCrX) alloy magnetic layer. The degree to which the C-axis of the HCP structure can be aligned perpendicular to the substrate strongly influences the magnetic properties, such as the perpendicular and horizontal coercivities.

The magnetic properties of a thin film alloy disk made with various substrates, a titanium (Ti) underlayer and a CoCr perpendicular magnetic layer are described by Kobayashi, et al. in "High Density Perpendicular Magnetic Recording on Rigid Disks", *Fujitsu Scientific and Technical Journal*, Vol. 19, No. 1, pp. 99–126, March, 1983. That article discloses that substantially improved perpendicular magnetic anisotropy of the CoCr film is achieved with the use of a Ti underlayer, and suggests that the C-axis orientation of the CoCr film is improved because the Ti underlayer isolates the influence of the substrate from the CoCr film. A thin film alloy disk having a nonmagnetic cobalt-tantalum (CoTa) alloy as an underlayer for a CoCr perpendicular magnetic layer is disclosed in Japanese published unexamined patent application No. 59-77620 assigned to Suwa Seikosha Co., Ltd.

It is also known to use ternary alloys, such as cobalt-chromium-tantalum (CoCrTa), as the material for the magnetic layer. Published European patent application no. 93838 assigned to Teijin, Ltd. discloses a disk for vertical magnetic recording having a soft magnetic underlayer of an amorphous CoTa alloy and a magnetic layer of CoCrTa with perpendicular magnetic anisotropy. The magnetic properties of a vertical recording disk with an 8000 Angstroms thick CoCrTa magnetic layer deposited on a 1000 Angstroms thick Cr underlayer are described by Langland and Albert in "Recording on Perpendicular Anisotropy Media with Ring Heads", *IEEE Transactions on Magnetics*, Vol. MAG17, No. 6, November, 1981, pp. 2547–2549.

SUMMARY

The invention is a thin film metal alloy disk for vertical recording which has a magnetic layer with substantially improved perpendicular magnetic anisotropy formed over an improved underlayer or nucleating layer which is deposited on the substrate. Both the nucleating layer and the magnetic layer have an HCP crystalline structure and hexagonal cell constants ($a_0$) which are approximately identical (or related by an integral multiple), so that the nucleating layer enhances the perpendicular orientation of the C-axis of the HCP magnetic layer.

More particularly, the nucleating layer formed on the substrate comprises a first constituent selected from a group of elements and a second constituent of either cobalt, chromium, or a solid substitutional solution alloy of cobalt and chromium, in which the first constituent element and the second constituent are present in a fixed stoichiometric ratio so as to form a distinct intermediate alloy phase known as an "intermetallic compound". The magnetic layer formed over the nucleating layer is a ternary alloy comprising cobalt, chromium and typically the same element as the element used as the first constituent in the nucleating layer. The type and amount of materials used in the nucleating and magnetic layers are selected so that there is a close matching of the hexagonal cell constants.

The resulting vertical recording medium has substantially improved perpendicular magnetic anisotropy because there is minimal C-axis dispersion of the magnetic layer. This is believed to be the result of the close lattice matching of the hexagonal cell constants of the nucleating and magnetic layers.

For a fuller understanding of the nature and advantages of the present invention, reference should be made to the following detailed description taken in conjunction with the accompanying drawings.

BRIEF DESCRIPTION OF THE DRAWINGS

FIG. 1 is a representation of a vertical magnetic recording medium according to the present invention taken in cross section;

FIG. 2 is a B-H hysteresis loop for a $(Co_{80}Cr_{20})_{90}W_{10}$ magnetic layer formed on a $(Co_{80}Cr_{20})_3W$ nucleating layer;

FIG. 4 is an X-ray diffraction curve illustrating a peak intensity for $Co_3W$ and corresponding points where diffraction peaks would occur for $Co_{82}Cr_{18}$ and $(Co_{80}Cr_{20})_{90}W_{10}$.

DESCRIPTION OF THE PREFERRED EMBODIMENTS

Figure 3:
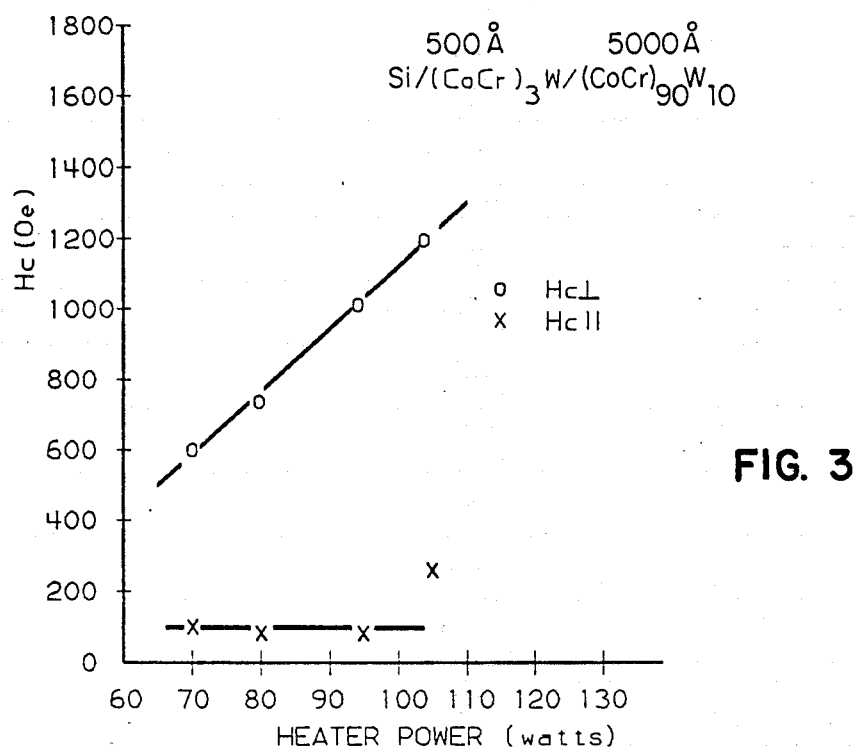
FIG. 3 is a graph of perpendicular and horizontal coercivities of the medium as a function of heater power for a $(Co_{80}Cr_{20})_{90}W_{10}$ magnetic layer formed on a $(Co_{80}Cr_{20})_3W$ nucleating layer.

The vertical magnetic recording disks made in accordance with the present invention utilize a nucleating layer, onto which the magnetic layer is deposited, which comprises either a binary or ternary intermetallic compound. As used herein the term "intermetallic compound" refers to those chemical compositions which are more than a simple mixture in the form of an alloy, but in which the constituents are present in a fixed stoichiometric ratio so that the composition can be essentially represented by a chemical formula. An intermetallic binary compound of two elements, such as cobalt and tungsten, is an intermediate phase which exists only at the discrete stoichiometric ratio of three atoms of cobalt to one atom of tungsten. The $Co_3W$ intermetallic compound is indicated on the published phase diagrams for cobalt and tungsten, such as in *Constitution of Binary Alloys*, McGraw Hill, 1958, p. 519. In a ternary intermetallic compound, the first constituent is a single element and the second constituent is an alloy in which one of the elements in the alloy is present in solid substitutional solution. For example, the ternary intermetallic compound $(Co_{82}Cr_{18})_3W$ is identical in structure to $Co_3W$ with the exception that certain Co atoms are replaced by Cr atoms in substitutional sites. Table 1 lists binary and ternary intermetallic compounds capable of use as nucleating layers. All of the intermetallic compounds in Table 1 have a hexagonal crystalline structure. The lattice or cell constants for the binary intermetallic compounds are also indicated in Table 1.

TABLE 1
INTERMETALLIC COMPOUNDS

| Binary | Ternary | Binary Cell Constant (Angstroms) |
|---|---|---|
| $Co_3W$ | $(CoCr)_3W$ | $a_0 = 5.13$ |
| $Co_3Mo$ | $(CoCr)_3Mo$ | $a_0 = 5.11$ |
| $Co_2Nb$ | $(CoCr)_2Nb$ | $a_0 = 5.19$ |
| $Co_3Ti$ | $(CoCr)_3Ti$ | $a_0 = 2.55$ |
| $Co_3V$ | $(CoCr)_3V$ | $a_0 = 5.03$ |
| CrIr | | $a_0 = 2.67$ |
| $Cr_2Nb$ | | $a_0 = 4.93$ |
| $Cr_2Zr$ | | $a_0 = 5.10$ |

Each of the ternary intermetallic compounds in Table 1 has a nearly identical hexagonal cell constant $a_0$ as its corresponding binary intermetallic compound. This is because the Cr is present in solid substitutional form in the ternary alloy and because Co and Cr have nearly identical atomic radii.

The disks made according to the present invention utilize a silicon substrate, a ternary intermetallic compound of $(Co_{80}Cr_{20})_3W$ as a nucleating layer and a magnetic layer of $(Co_{80}Cr_{20})W$. FIG. 1 is a representation of such a disk in sectional view. The $(Co_{80}Cr_{20})_3W$ nucleating layer was formed by sputter deposition on the silicon substrate in a DC magnetron sputtering chamber with an argon pressure of $2 \times 10^{-3}$ Torr and for various substrate deposition temperatures. Separate targets of $Co_{80}Cr_{20}$ and W were used to form the nucleating layer. The power to the $Co_{80}Cr_{20}$ and W targets was controlled to give the 3 to 1 stoichiometric ratio. The magnetic layer of $(Co_{80}Cr_{20})_{90}W_{10}$ was then sputter deposited on the nucleating layer without breaking vacuum in the sputtering chamber but by altering the power to the respective targets. FIG. 2 is a B-H hysteresis loop for the disk shown in FIG. 1. The disk has a perpendicular coercivity of 1000 Oersteds (Oe) and a horizontal coercivity of 75 Oe.

As shown in FIG. 3, the formation of the disks at various substrate deposition temperatures, which is directly related to heater power, shows that the perpendicular coercivity increases generally linearly with higher power, whereas the in-plane or horizontal coercivity does not change appreciably. The ability to increase the perpendicular coercivity independently of the horizontal coercivity is a distinct advantage in the fabrication of vertical magnetic recording media, and is believed to be caused by lattice matching of the hexagonal cell constants between the nucleating layer and the magnetic layer. For example, as shown in Table 1, the $(Co_{80}Cr_{20})_3W$ nucleating layer has a hexagonal cell constant approximately the same as $Co_3W$, i.e. $a = 5.13$ Angstroms, which is approximately twice that of the hexagonal cell constant for the $(Co_{80}Cr_{20})_{90}W_{10}$ magnetic layer.

The relationship between the hexagonal cell constants ($a_0$) for the nucleating layer and the magnetic layer can be understood by reference to Table 1 and to FIG. 4, which is an X-ray diffraction curve for a 100 Angstroms thick layer of a binary intermetallic compound of $Co_3W$ deposited on a silicon substrate. This film shows a peak X-ray intensity at approximately 43.5°. The hexagonal cell constant for $Co_3W$ layer can be determined from the X-ray diffraction curve (which yields the peak diffraction angle $2\theta$) and the relationship $$\lambda = 2D \sin \theta,$$

where $\lambda$ is the wavelength of the X-ray and D is the Bragg plane spacing. The Bragg plane spacing D is directly related to the hexagonal cell constant $a_0$. $Co_{80}Cr_{20}$ is hexagonal with a cell constant $a_0 = 2.52$ Angstroms. As shown in Table 1, nucleation layers of $Co_3W$, $Co_3Mo$, $Co_2Nb$, $Co_3V$, $Cr_2Nb$ and $Cr_2Zr$ exhibit a value of $a_0$ which is approximately twice that for $Co_{80}Cr_{20}$, while nucleation layers of $Co_3Ti$ and CrIr exhibit a value of $a_0$ which is approximately equal to that for $Co_{80}Cr_{20}$. Also shown on FIG. 4 are lines indicating where the peak X-ray intensities would occur for $Co_{82}Cr_{18}$ and $(CoCr)_{90}W_{10}$. Even though FIG. 4 indicates that $Co_3W$ and $Co_{82}Cr_{18}$ have relatively close peak diffraction angles, $2\theta$, there is almost an identical match between $Co_3W$ and $(Co_{80}Cr_{20})_{90}W_{10}$ (the $a_0$ cell constant of $Co_3W$ being almost exactly twice that for $(Co_{80}Cr_{20})_{90}W_{10}$). Thus, the addition of W to the magnetic layer changes the hexagonal cell constant to a closer match with the hexagonal cell constant for the underlying nucleating layer.

Figure 5:
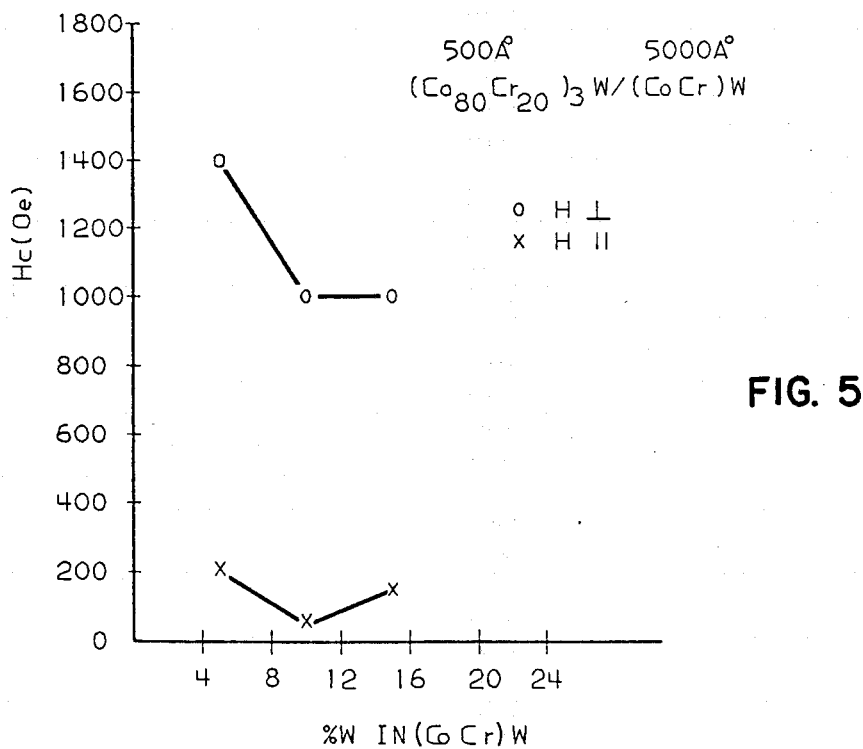
FIG. 5 is a graph of perpendicular and horizontal coercivities of the medium as a function of percent W in the $(Co_{80}Cr_{20})W$ magnetic layer.

FIG. 5 shows the relationship between the perpendicular and horizontal coercivities of three disks with a (CoCr)W magnetic layer deposited over a $(CoCr)_3W$ nucleating layer for different percentages of W present in the magnetic layer. All of the disks show an excellent ratio of perpendicular to horizontal coercivities, with the minimum horizontal coercivity occurring at a W concentration of about 10 at.%. The thickness of the $(CoCr)_3W$ nucleating layers for the disks of FIG. 5 was 500 Angstroms. However, other disks were made with thicknesses of the nucleating layer between 300 and 1000 Angstroms with no significant effect on the magnetic properties.

The orientation of the $(Co_{80}Cr_{20})_3W/(Co_{80}Cr_{20})_{90}W_{10}$ film structure deposited at 95 Watts (FIG. 3) was established by X-ray diffraction to measure the dispersion of the C-axis. An absolute measurement of orientation was obtained by deposition of the film structure on a polyimide substrate and examination of the film structure in transmission and reflection. The X-ray diffraction spectra obtained in reflection showed that only the (0002) planes are parallel to the film surface. The X-ray diffraction spectra obtained in transmission, which is sensitive to planes with a normal component to the film surface, showed that only planes normal to the [00.2] axis are present. These results indicate that the $(Co_{80}Cr_{20})_3W$ nucleation layer is nearly perfectly lattice matched to the $(Co_{80}Cr_{20})_{90}W_{10}$ magnetic layer.

In the magnetic layers of the media made according to the present invention the Cr preferably comprises between approximately 14 and 22 at.% of the CoCr. This is the range of solid solution alloy of interest in vertical recording media, because below approximately 14 at.% the magnetization is still principally in-plane and above approximately 22 at.% the magnetic moment has been appreciably diminished.

The nucleating layer in the present invention was formed by sputter deposition from two separate targets, one of $Co_{80}Cr_{20}$ and one of W, by controlling the power to the respective targets so that the proper 3 to 1 stoichiometric ratio can be achieved during the sputter deposition process. It is also possible to purchase commercially available targets of $Co_3W$ or $(CoCr)_3W$ so that a single target can be used to sputter deposit the nucleating layer.

The above description and drawings relate only to the invention which forms a part of the vertical recording media and not to the well known portions of the media and the media fabrication processes. For example, in the fabrication of thin film metal alloy disks, it is known to provide a protective overcoat, such as a sputtered carbon film, over the magnetic layer and in certain instances to provide an adhesion layer, such as a sputtered titanium film, between the overcoat and the magnetic film. In addition, if the media were to be used with vertical magnetic recording pole heads located on the same side of the media, then it would be necessary to provide a soft magnetic underlayer, such as nickel-iron (NiFe), between the nucleating layer and the substrate to provide a magnetic flux return path.

While the preferred embodiments of the present invention have been illustrated in detail, it should be apparent that modifications and adaptations of those embodiments will occur to those skilled in the art without departing from the scope of the present invention as set forth in the following claims.

What is claimed is:

1. A magnetic recording disk for vertical recording comprising:
   a substrate;
   a nucleating layer formed on the substrate comprising a first constituent of an element selected from the group consisting of tungsten (W), molybdenum (Mo), niobium (Nb), titanium (Ti), vanadium (V), iridium (Ir), and zirconium (Zr), and a second constituent consisting of either cobalt (Co), chromium (Cr), or a solid substitutional solution alloy of CoCr, wherein the amounts of the first and second constituents are present in a fixed stoichiometric ratio so as to form an intermetallic compound with a hexagonal crystalline structure; and
   a magnetic layer formed on the nucleating layer comprising a ternary alloy of the form $(Co_{100-y}Cr_y)X$, wherein y is approximately in the range of 14 to 22 and wherein X is selected from the group consisting of W, Mo, Nb, Ti and V, the magnetic layer having a hexagonal crystalline structure with its C-axis oriented generally perpendicular to the substrate, the hexagonal cell constant $a_0$ of the nucleating and magnetic layers being related by approximate integral multiples so as to enhance the hexagonal crystalline orientation of the magnetic layer formed on the nucleating layer.

2. The magnetic recording disk according to claim 1 including a protective overcoat formed over the magnetic layer.

3. The magnetic recording disk according to claim 1 including a soft magnetic underlayer between the nucleating layer and the substrate for providing a magnetic flux return path.

4. The magnetic recording disk according to claim 1 wherein the first constituent is either W, Mo, Nb, Ti or V, wherein the second constituent is Co or CoCr alloy, and wherein the selected element X in the magnetic layer is the same as the first constituent in the nucleating layer.

5. The magnetic recording disk according to claim 1 wherein the first constituent is Ir, Nb or Zr, the second constituent is Cr and the stoichiometric ratio of the second constituent to the first constituent is 2 to 1.

6. A magnetic recording disk for vertical recording comprising:
   a substrate; and
   a nucleating layer of Co and W formed on the substrate, the amounts of Co and W being present in a stoichiometric ratio of three to one so as to form the intermetallic phase $Co_3W$ of cobalt and tungsten, the $Co_3W$ having a hexagonal crystalline structure with its C-axis oriented generally perpendicular to the substrate;
   a magnetic layer formed on the nucleating layer and comprising a ternary alloy of Co, Cr, and W, and CoCrW alloy having a hexagonal crystalline structure with its C-axis oriented generally perpendicular to the substrate, the amount of W present in the CoCrW magnetic layer being such that the hexagonal cell constant $a_0$ of the CoCrW alloy is approximately half the hexagonal cell constant of the $Co_3W$ nucleating layer, whereby the hexagonal crystalline orientation of the magnetic layer formed on the nucleating layer is enhanced.

7. The magnetic recording disk according to claim 6 including a protective overcoat formed over the magnetic layer.

8. The magnetic recording disk according to claim 6 including a soft magnetic underlayer between the nucleating layer and the substrate for providing a magnetic flux return path.

9. A magnetic recording disk for vertical recording comprising:
   a substrate;
   a nucleating layer having a hexagonal crystalline structure formed on the substrate and comprising an intermetallic phase of W and the solid substitutional solution of Co and Cr, the amount of W and CoCr being present in a stoichiometric ratio of 3 to 1 so as to form the intermetallic compound $(CoCr)_3W$;
   a magnetic layer formed on the nucleating layer and comprising a ternary alloy of Co, Cr and W, the magnetic layer having a hexagonal crystalline structure with its C-axis oriented generally perpendicular to the substrate, the amount of W present in the CoCrW magnetic layer being such that the hexagonal cell constant of the CoCrW alloy is approximately half the hexagonal cell constant $a_0$ of the $(CoCr)_3W$ nucleating layer, whereby the hexagonal crystalline orientation of the magnetic layer formed on the nucleating layer is enhanced.

10. The magnetic recording disk according to claim 9 including a protective overcoat formed over the magnetic layer.

11. The magnetic recording disk according to claim 9 including a soft magnetic underlayer between the nucleating layer and the substrate for providing a magnetic flux return path.

* * * * *

UNITED STATES PATENT AND TRADEMARK OFFICE
CERTIFICATE OF CORRECTION

PATENT NO. : 4,657,824
DATED : April 14, 1987
INVENTOR(S) : James K. Howard

It is certified that error appears in the above—identified patent and that said Letters Patent is hereby corrected as shown below:

IN THE ABSTRACT

Line 6, "magntic" should be --magnetic--.

IN THE CLAIMS

Column 6, line 15, claim 6, delete "and".

Column 6, line 22, claim 6, after "substrate;" add --and--.

Column 6, line 24, claim 6, "and" should be --the--.

Signed and Sealed this

Twenty-fifth Day of August, 1987

*Attest:*

DONALD J. QUIGG

*Attesting Officer*   Commissioner of Patents and Trademarks